US012781098B2

(12) United States Patent
Ross et al.

(10) Patent No.: US 12,781,098 B2
(45) Date of Patent: Nov. 3, 2026

(54) PROCESS FOR CREATING A SUBLIMATED PRINTED HEAT-SEALABLE APPLIQUE

(71) Applicant: Avery Dennison Retail Information Services LLC, Mentor, OH (US)

(72) Inventors: Gillian Ross, Ellicott City, MD (US); Owen Mcgovern, Ellicott City, MD (US); Paul Weedlun, Ellicott City, MD (US); Stephen Mynott, Natick, MD (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/855,419

(22) PCT Filed: Jan. 27, 2023

(86) PCT No.: PCT/US2023/011745
§ 371 (c)(1),
(2) Date: Oct. 9, 2024

(87) PCT Pub. No.: WO2023/211523
PCT Pub. Date: Nov. 2, 2023

(65) Prior Publication Data

US 2025/0250465 A1 Aug. 7, 2025

Related U.S. Application Data

(60) Provisional application No. 63/336,642, filed on Apr. 29, 2022.

(51) Int. Cl.
*B32B 7/12* (2006.01)
*B32B 3/08* (2006.01)
(Continued)

(52) U.S. Cl.
CPC .................................... *C09J 7/35* (2018.01); *B32B 3/08* (2013.01); *B32B 7/12* (2013.01); *C09J 175/04* (2013.01);
(Continued)

(58) Field of Classification Search
CPC .. B32B 3/02; B32B 3/08; B32B 5/024; B32B 7/12; B32B 7/230731; C09J 7/35; D06P 5/004; D06Q 1/00
See application file for complete search history.

(56) References Cited

U.S. PATENT DOCUMENTS 10,252,502 B2 * 4/2019 Weedlun ................ B32B 37/08
10,611,133 B2 * 4/2020 Weedlun ................ B32B 5/022
(Continued)

FOREIGN PATENT DOCUMENTS

JP 2001-38839 2/2001
JP 3099593 U 4/2004
(Continued)

OTHER PUBLICATIONS

EP 2924165 (Year: 2015).*
(Continued)

*Primary Examiner* — Elizabeth E Mulvaney

(57) ABSTRACT

A process for producing a colorfast thermal applique using a polyester fabric blank, dye-sublimation printing a graphic image on the fabric blank, and calendar or heat-press laminating a multi-layer composite consisting of two opposing outer layer polyurethane adhesive sides with a middle layer or layers of die impeding and absorbing polymers adhered onto the unprinted side of the printed fabric blank. The multi-zone composite comprises a first layer of clear or pigmented polyurethane adhesive followed by a pigmented disperse die impeding and absorbing polymer layer or layers and a third clear layer of polyurethane adhesive. The first layer of the triple-layer adhesive is fused under combined
(Continued)

temperature and pressure to the polyester blank until said first layers impregnates into said fabric blank. The fabric blank is then cut into a discrete finished applique which, upon application to a fabric substrate, does not substantially change the physical and visual characteristics of that substrate, including performance fabric substrates to which the applique is applied.

16 Claims, 3 Drawing Sheets

(51) Int. Cl.

| | |
|---|---|
| ***C09J 7/35*** | (2018.01) |
| ***C09J 175/04*** | (2006.01) |
| ***D06P 5/28*** | (2006.01) |
| ***D06Q 1/00*** | (2006.01) |

(52) U.S. Cl.

CPC ................ *D06P 5/004* (2013.01); *D06Q 1/00* (2013.01); *C09J 2301/208* (2020.08); *C09J 2301/50* (2020.08); *C09J 2400/221* (2013.01); *C09J 2400/28* (2013.01)

(56) References Cited

U.S. PATENT DOCUMENTS

| | | | |
|---|---|---|---|
| 11,130,364 | B2 | 9/2021 | McGovern et al. |
| 11,890,893 | B2 | 2/2024 | Ross et al. |
| 2003/0113517 | A1 | 6/2003 | Imamura et al. |
| 2011/0014837 | A1 | 1/2011 | Baqai et al. |
| 2012/0121869 | A1 | 5/2012 | Kuwahara |
| 2016/0220979 | A1 | 8/2016 | Terada et al. |
| 2017/0326857 | A1 | 11/2017 | Weedlun et al. |

FOREIGN PATENT DOCUMENTS

| | | |
|---|---|---|
| JP | 2004-195759 | 7/2004 |
| WO | 2011/125173 | 10/2011 |

OTHER PUBLICATIONS

International Search Report and Written Opinion dated May 16, 2023 issued in corresponding IA No. PCT/US2023/011745 filed Jan. 27, 2023.

International Preliminary Report on Patentability dated Oct. 29, 2024 issued in corresponding IA No. PCT/US2023/011745 filed Jan. 27, 2023.

* cited by examiner

PROCESS FOR CREATING A SUBLIMATED PRINTED HEAT-SEALABLE APPLIQUE

CROSS-REFERENCE TO RELATED APPLICATIONS

The present application is a national stage application under 35 U.S.C. § 371 of International Application No. PCT/US2023/011745, which was published in English on 2 Nov. 2023 as International Publ. No. WO 2023/211523, which claims priority from U.S. Provisional Patent Application No. 63/336,642 filed 29 Apr. 2022, each of which is incorporated by reference herein in its entirety.

BACKGROUND OF THE INVENTION

Technical Field

The present invention relates to the creation of heat-activated fabric transfers and applique and, particularly, to a heat transfer comprised of numbers, letters, logos, graphics, and other indicia that retains graphical integrity by inhibiting migration of disperse dye from the fabric transfer to the garment fabric or to the transfer from the garment fabric.

Background Art

Often "performance garments" are comprised of polyester fabrics that are color-dyed using a sublimation process. The dye sublimation process uses high heat to permanently fuse the colorant into the polyester fabric. For heat setting dye sublimation inks into polyester materials, temperatures in the range of 370-420° F. (188-216° C.) with dwell times of approximately 1 minute are typically required. The heat serves two critical functions: first it causes the pores of the polyester fabric to open up, so the material can accept the dye; and second, the heat converts the solid ink dye into a gas for diffusion into the fibers of the fabric. Manufacturers of performance apparel, uniforms, swim-wear, and sports accessories also use various methods to apply a variety of indicia, such as text, numbers, logos, graphics, and other indicia, to garments and textiles for decoration and identification, among other things. Common application technologies include silk-screening, screen-printing, and sublimated fabric heat-activated transfers.

Silk-screening of logos or emblems is commonly used, but this process does not result in a product that withstands repeated stretching and is complex and time-consuming. In addition, the designs created by silk-screening are flat, lack texture, and do not withstand repeated stretching or industrial or home washings. Consequently, many companies prefer sublimated printed fabric appliques as their primary method for applying decoration and identification. Thermally activated adhesive coatings are also used to apply appliques to garments and textiles. One common type of applique, typical of sports jersey and uniform numbering and lettering, is a layered applique comprising a solid first base layer that defines a numeral or letter and one or more top layers that are the same shape, but smaller than the layer below it, thereby creating a three dimensional appearance. Typically, each layer is made from dyed fabrics and each additional top layer is stitched to the layer below it. On the back of the solid base layer is a layer of thermal adhesive that covers the entire back surface. As disclosed in Applicant's U.S. Pat. No. 11,130,364, the thermally activated adhesive can be provided with a filler that can provide opacity to prevent the garment material color showing though the decoration.

A problem can arise if the applique is heat-pressed onto an underlying substrate that was pre-colored using dye sublimation. The heat can release the dye, causing migration into the applique and discoloration.

Another problem that can arise through die use of an opaque adhesive is the appearance of an opaque adhesive edge left visible along the edge of the decoration. Aesthetically this visual glue edge is undesirable and causes the appearance of the decoration to be objectionable. It would be greatly advantageous to provide a lightweight heat-sealed sublimated printed applique that can be applied to any garment or textile without having a loss of graphic caused by dye migration from the printed applique or from the underlying material it is heat applied to. It would also be beneficial if the visual adhesive edge was minimized, to improve overall applique appearance whilst providing suitable opacity to prevent show through of the garment material.

DISCLOSURE OF INVENTION

It is, therefore, an object of the present invention to provide a heat-sealed applique forming indicia such as text, numbers, logos, graphics, and other indicia that does not degrade graphically under normal conditions of use.

It is another object of the present invention to provide a heat-sealed applique that prevents show-through of the underlying garment patterns and prevents migration of dyes from the garment fabric to the applique.

It is another object of the invention to prevent the migration of the dyes or pigments from the graphic into the backing beneath to avoid color loss or fading.

It is another object of the present invention to provide a heat-sealed applique that prevents visual adhesive edges around the applique through the process of adhesion to the garment.

It is yet another object of the present invention to provide a heat-sealed applique that resembles a traditional layered applique often used for lettering and numbering on sports jerseys and uniforms.

And it is another object of the present invention to provide a heat-sealed applique that can be manufactured cost effectively.

According to the present invention, the above-described and other objects are accomplished by an applique comprising a base fabric material of suitable woven, nonwoven or knit polyester fiber composition and cut, the base fabric having a thermally activated adhesive coating on one side using a multi-layer composite comprised of a two layers of clear or pigmented polyurethane adhesive sandwiching one or more pigmented polymer layers configured for preventing dye migration either with a migration barrier, dye absorption polymer, or some combination. The polymer barrier layer(s) may be composed of polyurethanes or other appropriate thermoplastics that could be polyester, polyolefin or polyaramid based, and includes absorbing materials such as activated carbon, clays, siliceous material, zeolites, and alumina, and includes pigments for opacity such as titanium dioxide, antimony oxide, zinc oxide, magnesium silicate (talc), calcium sulfite, barium sulfate, zinc borate, anhydrous sodium potassium alumina silicate, calcium carbonate, or carbon black. A preferred embodiment of the applique includes a three-layer adhesive coating consisting of a clear or pigmented thermoplastic with a melting range between 100-140 deg. C., which is laminated to a second layer of pigmented dye-migration-resistant and/or absorbing thermoplastic having a melting range between 150-210 degrees C. Laminated to the second layer is a third clear layer of thermoplastic with a melting range between 100-140 degrees C. This third layer is used as the adhesive for securing the applique to other products. The applique is die-cut or laser-cut from a sheet or roll to a discrete predetermined indicia (text, number, logo, graphic, etc.).

The foregoing applique is manufactured by printing a graphic onto the applique base material. The three-layer composite is then fused under a temperature and pressure condition required to activate and flow the first layer of adhesive into the unprinted face of the base fabric material. The printed and laminated material is then cut through using lasers or other mechanical cutting means. The product can then be utilized to decorate apparel or other products by adhering the applique thereto by the third adhesive layer. This layer is activated at an equal or lower heat and pressure than during lamination of the adhesive to the printed layer.

The result is a decorated garment or other item bearing an applique that does not substantially change the physical and visual characteristics of the garment. The choice of at least two dissimilar thermoplastic materials in a three layer construction is achieved with:

1) a clear or pigmented lower-melt point bonding layer that bonds the unprinted side of the printed polyester fabric base layer; and
2) a pigmented layer used for opacity and as a dye migration barrier/absorber; and
3) a third clear layer reserved for the purpose of heat-sealing to the apparel or other type of product, which helps maintain the integrity of the printed graphs by inhibiting migration of inks or dyes in either direction, in conjunction with providing required opacity to prevent show through of garment color and reduced visual edge of the opaque adhesive material. In summary an applique with superior visual appearance.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a process for producing a heat-activated applique that retains graphical integrity by preventing migration of dye from the transfer or through the transfer from the garment fabric below. The opaque layered-adhesive composite also prevents show through of the garment fabric whilst providing minimal visual opaque adhesive at the edge of the applique. A preferred embodiment of the heat-activated applique comprises a graphic printed onto an applique base fabric, and then laminated with a three-layer heat-activated adhesive.

Figure 1:
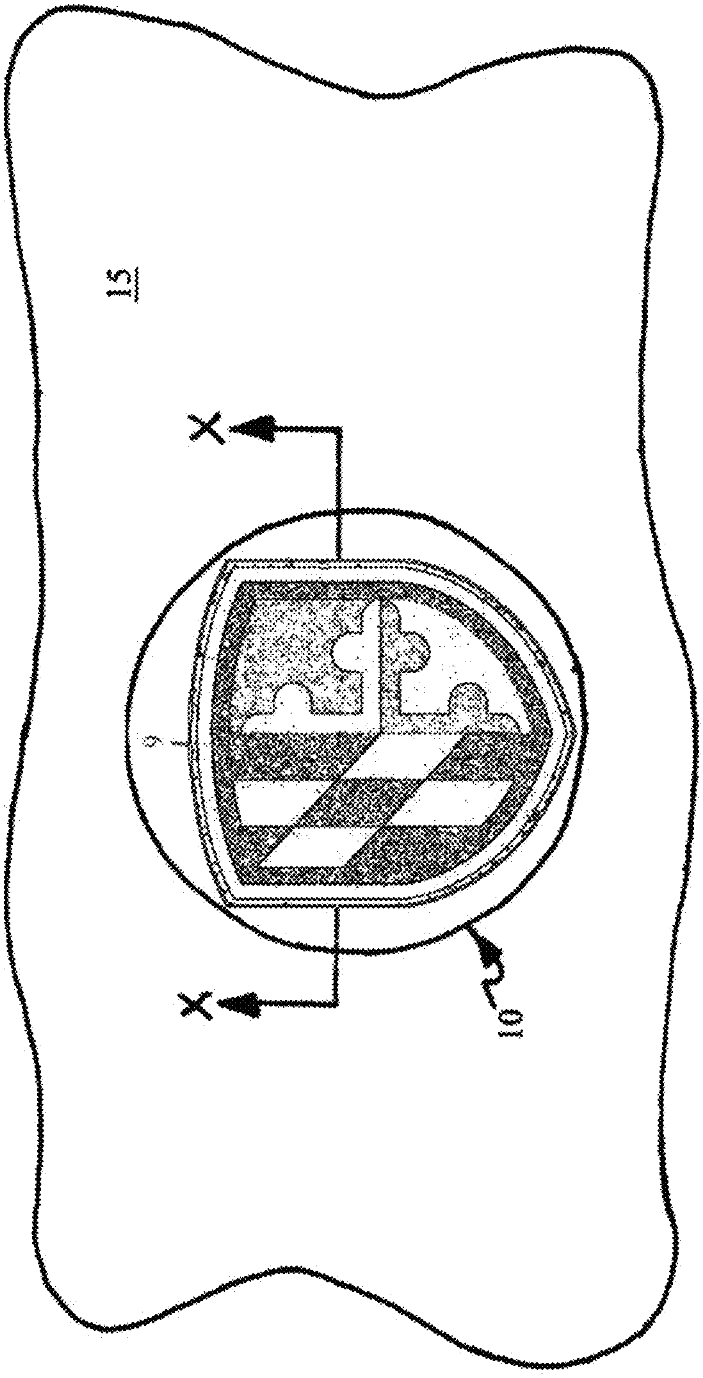
FIG. 1 is a top view of an applique emblem 10 according to the present invention as applied to apparel.
Figure 2:
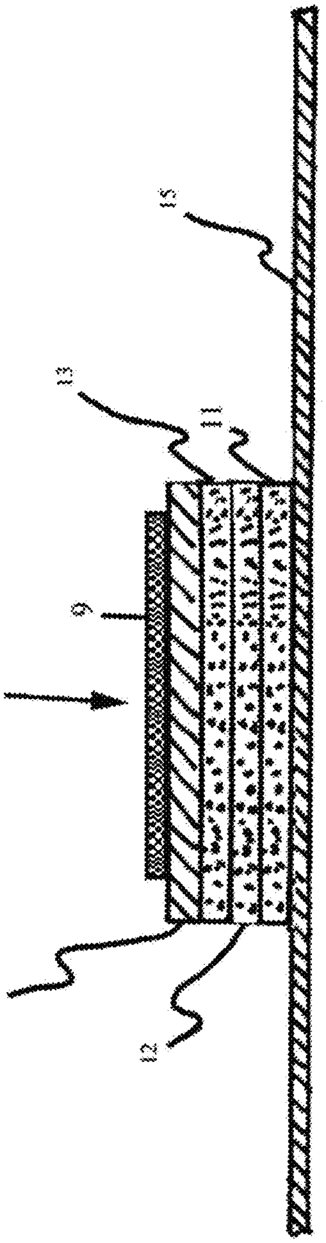
FIG. 2 is a cross-sectional view of an embodiment of the present invention taken at line x-x of FIG. 1.

With combined reference to FIGS. 1 and 2, the heat-activated applique 10 of the present invention includes a base fabric layer 14 printed on one side, and laminated on the other side to a three-layer thermal adhesive composite comprising two heat-activated adhesive layers 11, 13 sandwiching a dye migration barrier layer 12. The lower heat-activated adhesive layer 11 bonds the applique 10 to a substrate 15, which may be any fabric or leather or textile substrate. A graphic image 9 is printed atop the applique base fabric layer 14. The graphic 9 may be any decorative image or shape including alpha-numeric characters, logos or images. The graphic 9 can be printed atop the applique base fabric layer 14 by sublimation printing in which a dye is heat transferred into the surface of the fabric layer. The three composite thermal adhesive layers 11, 12, 13 collectively block migration of disperse dyes to the substrate 15 or from the substrate 15 to printed applique layer 14.

In a preferred embodiment the middle layer 12 comprises a layer of white-pigmented polyurethane blended with one or more dye-absorbing materials, preferably aluminum silicate, and having a melting point higher than upper and lower layers 11, 13 and within the range between 150-210 degrees C. The preferred white pigment in middle adhesive layer 12 is titanium dioxide ($TiO2$). Lower adhesive layer 11 comprises a clear layer of polyurethane with a melting point within the range between 100-140 degrees C. The lower adhesive layer 11 is used as the adhesive for securing the applique 10 to substrate 15 (apparel or other products), while the upper adhesive layer 13 comprises a clear polyurethane layer with a melting point with the range of 110-140 degrees C. reserved for securing the printed applique to base fabric layer 14. The middle polymer layer 12 serves to provide an opaque or semi-opaque layer, the white pigment serving as light reflecting suspended insoluble particles with no migration tendency themselves. The thermoplastic in this middle layer 12 has good dye migration resistance by barrier and/or absorption, and high temperature and UV resistance. All three layers 11, 12, 13 when combined provide a robust migration barrier that inhibits migration of ink or dyes to the substrate 15, or vice versa.

The applique 10 is well-suited for application to any fabric or leather substrate, including coarser non-woven fabrics such as felt and fleece ("substrate" being herein defined as any leather or fabric, whether woven fabric or non-woven fabric, or any other flexible material used for apparel, signage, banners, pennants or similar, and "non-woven" being herein defined as any fabric substrate produced by processes other than weaving).

Figure 3:
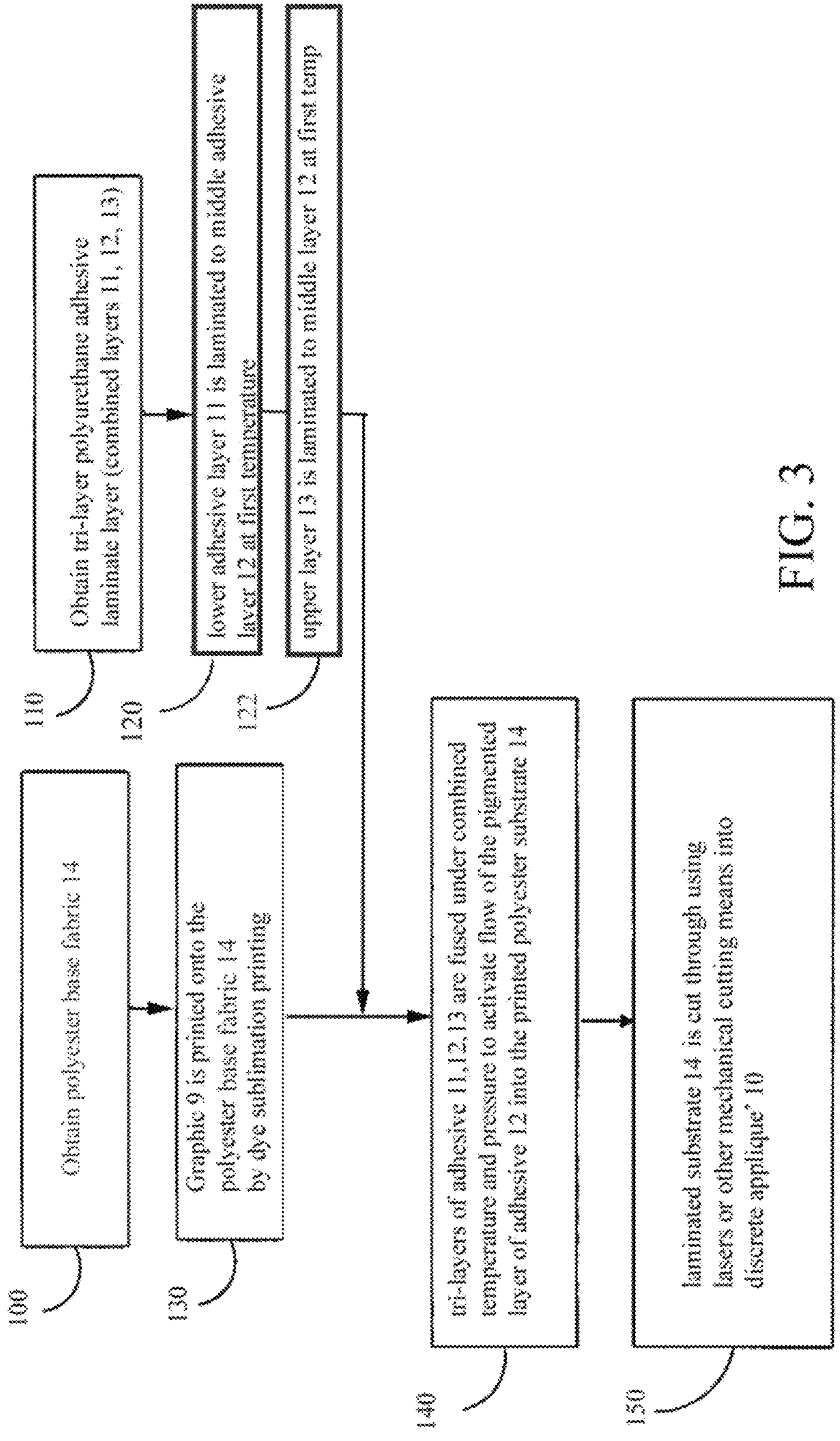
FIG. 3 is a process diagram of the process for creating the applique 10 of FIGS. 1-2.

FIG. 3 is a process diagram of the process for creating the applique 10 of FIGS. 1-2. The process begins by obtaining the components thereof.

Specifically, at step 100 a polyester fabric blank is acquired.

At step 110 a three-layer polymer thermal adhesive composite is acquired with adhesive laminate layers (combined layers 11, 12, 13). The triple-layer composite laminate 11, 12, 13 is preferably created in advance for ready-made application to the applique fabric base layer 14. One skilled in the art will readily understand that the separate layers 11, 12, 13 may be individually-applied to applique base fabric layer 14 or substrate 15 with the same result, but it is more efficient and economical to pre-produce the triple-layer composite laminate in advance for ready-made application to the applique base fabric layer 14. Pre-production of triple-layer composite laminate layer (combined layers 11, 12, 13) is accomplished as follows:

At step 120 a lower adhesive layer 11 of clear or pigmented ink resistant polyurethane is laminated to the white middle polymer layer 12 at a first temperature preferably within a range of from 100 degrees C. to 140 degrees C., and at step 122 (which is preferably but not necessarily performed simultaneous to 120) an upper adhesive layer 13 of clear polyurethane is laminated to middle adhesive layer 12 at said first temperature. The lower adhesive layer 11 has a melting range of 100-140 degrees C., and the upper adhesive layer 13 has a melt range of 110-140 degrees C. The first temperature is sufficient to melt the lower and upper adhesive layers 11, 13. This will fuse the lower and upper adhesive layers 11, 13 to the middle polymer layer 12, but the first temperature is below the melting range of the white middle layer 12. This lower adhesive layer 11 is used as the adhesive for securing the applique 10 to substrate 15 or other products, while the upper adhesive layer 13 is reserved for securement to applique base fabric layer 14. This step 120 effectively forms the composite triple-layer polyurethane adhesive laminate, that it may be sandwiched between sheets of release paper for later use. Upon cooling the result of step 120 is a triple-layer polymer composite laminate layer comprising combined layers 11, 12 and 13.

Referring back to the applique base fabric layer 14, at step 130 a graphic 9 is printed onto one side of the base fabric layer 14.

At step 140 the triple-layer composite adhesive laminate produced in step 120 including layers of adhesive 11, 13, and polymer disperse dye impeding and absorbing layer 12 are fused to the printed fabric applique layer 14. Upper layer 13 is fused directly to the non-printed side of the base fabric layer 14 under a combined temperature and pressure condition sufficient to activate and flow the clear upper layer of adhesive 13 into the base fabric layer 14. Typically, an appropriate heat-sealing condition uses a temperature is 10 degrees C. higher than the melting point of the adhesive layers and a pressure of 30-80 psi.

At step 150 the now-printed and laminated base fabric layer 14 is cut through using lasers or other mechanical cutting means into a discrete applique 10. The applique 10 can then be utilized to decorate, apparel or other products, by adhering the applique 10 using the clear adhesive layer 11 which is activated at a lower heat and pressure than required to melt flow the middle white layer polymer 12.

The result is a decorated applique 10 utilizing a base fabric layer 14 with a printed graphic 9. The choice of at least two dissimilar polymers including at least one adhesive arranged in three layers 11, 12, 13, two such layers 11, 13 being clear adhesive and one 11 being reserved for the purpose of heat-sealing to the apparel substrate 15, plus one pigmented layer 12 there between helps maintain the integrity of the printed graphs by blocking migration of disperse dyes in either direction. The decorated applique 10 may be processed under conditions appropriate to its use and function. The migration resistance of the combined triple-layer composite 11, 12, 13 was measured in both wet and dry conditions as per American Association of Textile Chemists and Colorists (AATCC) 163 (Colorfastness-Die transfer in storage) and provided a $\Delta E<0.5$ on average across the range of sublimation 20 colors red, orange, yellow, green, blue, indigo, and violet (ROYGBIV). $\Delta E$ is a spectroscopic colorfastness standard measurement of variation. $\Delta E$ of $<0.5$ is almost imperceptible to the average person, and prior adhesives used for similar purposes could not achieve better than $\Delta E<0.7$. This new adhesive formulation also provides a means of application with reduced visual adhesive edge, whilst still providing the required opacity to prevent garment color show through. The adhesive edge was measured on average to be <0.2 mm. Adhesives with required opacity used prior to this development could have an adhesive edge as high as 0.4 mm.

It should now be apparent that the foregoing results in a color-printed and/highlighted applique 10 as in FIGS. 1-2 30 that gives an aesthetically-pleasing embossed or otherwise color-contrasted appearance in a form that is easily applied to a garment or other textile.

Figure 4:
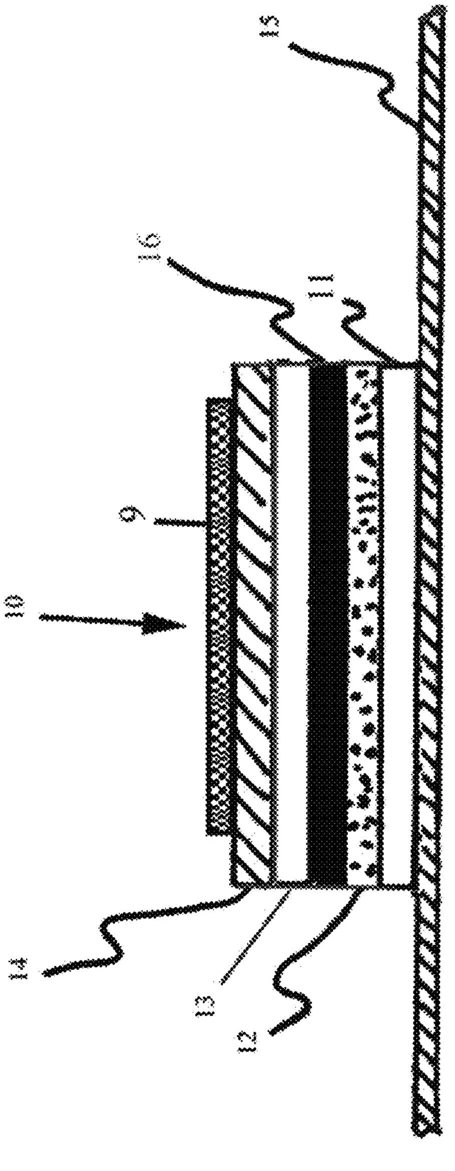
FIG. 4 is a cross-sectional view of an alternate embodiment of the present invention.

In an alternate embodiment as shown in FIG. 4 the composite adhesive laminate is comprised of four layers 11, 12, 13 and 16, with a clear first adhesive layer 11 reserved for adhering to the unprinted face of the base fabric layer 14 with a melting point of 110-135 degrees C. The first layer 11 is laminated to a white pigmented second layer 12 having a melting point of 155-210 degrees C., which is in turn laminated to a black or darkly pigmented third barrier layer 16 of polyurethane having a melting point of 155-210 C. The third layer 16 is laminated to a clear adhesive layer 13 having a melting point of 110-135 degrees C., and reserved for adhering to a garment or other textile. In this embodiment the pigmented polymeric layers 12, 16 do not melt when heat-sealed to the fabric applique layer 14 or the garment or textile, as the clear adhesive layers 11, 13 melt at much lower temperatures and are reserved for adhesion. Because the pigmented layers 12, 16 do not flow during application, visual adhesive edges around the applique are prevented. Additionally, the black or darkly pigmented layer performs the double function of preventing dyes from entering the pigmented white layer as well blocking any color non uniformities in the garment, for instance if it were patterned. The pigmented white layer thus stays completely uniform regardless of the garment patterning or migration and serves to brighten the appearance of the applique relative to using only a single black or darkly colored pigmented layer. The preferred white pigment in this embodiment is titanium dioxide and the preferred black pigment is active carbon. The result is a heat-sealable fabric applique well suited for patterned garments and textiles or those garments and textiles that are prone to significant migration.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

STATEMENT OF INDUSTRIAL APPLICABILITY

Hot-pressing a thermal applique onto an underlying substrate that was pre-colored using dye sublimation can release the dye, causing migration into the applique and discoloration. In addition, thermal appliques can produce an undesirable opaque adhesive edge along the edge of the decoration. It is another object to provide an improved production process by which said appliques can be manufactured cost effectively.

The invention claimed is:

1. A heat-sealable applique, comprising:

a base fabric printed on one side with a dye; and a thermal adhesive laminated to an opposing side of said base fabric, said thermal adhesive comprising a multi-layer composite, including, a first layer of polyurethane adhesive having a melting temperature within a range of between 110-135 deg. C, a third layer of polyurethane adhesive having a melting temperature within a range of between 110-135 deg. C, and a second polymer barrier layer between said first layer and third layer, said second polymer barrier layer comprising a first pigmented layer and a second pigmented layer, wherein the second pigmented layer is darker than the first pigmented layer, configured for preventing dye migration there through and having a melting temperature higher than said first layer and third layer and within a range of between 155-210 deg. C, whereby said first layer is fused directly into the unprinted opposing side of said base fabric and separates said second layer and third layer from said base fabric, said second layer prevents dye migration from said base fabric layer to said third layer and vice versa, and said second pigmented layer configured for blocking color nonuniformities into the first pigmented layer.

2. The heat-sealable applique according to claim 1, wherein the second polymer barrier layer comprises any one or more from among a group consisting of polyurethane, polyester, polyolefin and polyaramid.

3. The heat-sealable applique according to claim 1, wherein the second polymer barrier layer comprises a dye absorbing material.

4. The heat-sealable applique according to claim 3, wherein the second polymer barrier layer comprises activated carbon.

5. The heat-sealable applique according to claim 1, wherein the second polymer barrier layer comprises an opaque pigment.

6. The heat-sealable applique according to claim 5, wherein the opaque pigment comprises any one or more from among the group consisting of titanium dioxide, antimony oxide, zinc oxide, magnesium silicate, calcium sulfite, barium sulfate, zinc borate, anhydrous sodium potassium alumina silicate, calcium carbonate, and carbon black.

7. The heat-sealable applique according to claim 6, wherein the opaque pigment comprises particles suspended in polymer.

8. The heat-sealable applique according to claim 7, wherein the opaque pigment of the first pigmented layer comprises white-pigmented particles and the opaque pigment of the second pigmented layer comprises black-pigmented particles.

9. A heat-sealable applique, comprising:

a base fabric printed on one side with a dye; and a thermal adhesive laminated to an opposing side of said base fabric, said thermal adhesive comprising a multilayer composite, including, a first layer of polyurethane adhesive having a melting temperature within a range of between 110-135 deg. C, a second layer of polyurethane adhesive having a melting temperature within a range of between 110-135 deg. C, a white-pigmented polymer barrier layer between said first layer and second layer, and a black-pigmented polymer barrier layer between said first layer and second layer, said white-pigmented polymer barrier layer and said black-pigmented polymer barrier layer having a melting temperature higher than said first layer and second layer and within a range of between 155-210 deg. C, whereby said first layer is fused directly into the unprinted opposing side of said base fabric and separates said white-pigmented polymer barrier layer, said black-pigmented polymer barrier layer, and said second layer from said base fabric, and said white-pigmented polymer barrier layer and said black-pigmented polymer barrier layer prevent dye migration from said base fabric layer to said second layer and vice versa.

10. The heat-sealable applique according to claim 9, wherein the white-pigmented polymer barrier layer and said black-pigmented polymer barrier layer both comprise any one or more from among a group consisting of polyurethane, polyester, polyolefin and polyaramid.

11. The heat-sealable applique according to claim 10, wherein the black-pigmented polymer barrier layer comprises a dye absorbing material.

12. The heat-sealable applique according to claim 11, wherein the dye absorbing material comprises activated carbon.

13. The heat-sealable applique according to claim 10, wherein the white-pigmented polymer barrier layer comprises titanium dioxide particles suspended in polymer.

14. A process for making a heat-sealable applique, comprising the steps of:

printing a base fabric on one side with a graphic by dye sublimation printing;

obtaining a multi-layer composite adhesive film having a first layer of polyurethane adhesive with a melting temperature within a range of between 100-140 deg. C, a second layer of polyurethane adhesive having a melting temperature within a range of between 100-140 deg. C, and a multi-layer polymer barrier between said first layer and second layer having a white-pigmented layer and a black-pigmented layer, said multi-layer polymer barrier configured for preventing dye migration there through and having a melting temperature higher than said first layer and second layer and within a range of between 150-210 deg. C;

fusing the first layer of said multi-layer composite adhesive film directly into the unprinted opposing side of said base fabric, leaving said multi-layer polymer barrier layer and second layer separated from the base fabric;

whereby said multi-layer polymer barrier layer prevents dye migration from said base fabric layer to said second layer and vice versa.

15. The process for making a heat-sealable applique according to claim 14, wherein said white-pigmented layer comprises titanium-dioxide particles suspended in polymer and said black-pigmented layer comprises carbon black particles suspended in polymer.

16. The process for making a heat-sealable applique according to claim 14, wherein said step of fusing the first layer of said multi-layer composite adhesive film directly into the unprinted opposing side of said base fabric comprises applying pressure.

* * * * *